United States Patent
Hokazono et al.

(10) Patent No.: US 8,011,518 B2
(45) Date of Patent: Sep. 6, 2011

(54) CRYSTALLINE POLYMER MICROPOROUS FILM, MANUFACTURING METHOD OF THE SAME, AND FILTRATION FILTER

(75) Inventors: Hirohisa Hokazono, Kanagawa (JP); Toshiki Taguchi, Tokyo (JP); Hidetaka Okada, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 220 days.

(21) Appl. No.: 12/203,174

(22) Filed: Sep. 3, 2008

(65) Prior Publication Data

US 2009/0061205 A1    Mar. 5, 2009

(30) Foreign Application Priority Data

Sep. 4, 2007   (JP) .................. 2007-229183

(51) Int. Cl.
  *B01D 39/00* (2006.01)
  *B01D 39/02* (2006.01)
  *B01D 43/02* (2006.01)
  *B01D 29/00* (2006.01)

(52) U.S. Cl. .............. 210/500.36; 210/490; 210/500.27; 264/532; 428/212; 428/218; 428/310.5

(58) Field of Classification Search ............. 210/500.27, 210/490, 500.36; 264/532; 428/212, 218, 428/310.5; 156/182, 273, 275.5; 521/134
See application file for complete search history.

(56) References Cited

U.S. PATENT DOCUMENTS

| | | | |
|---|---|---|---|
| 1,421,341 A | 6/1922 | Zsigmondy et al. | |
| 2,783,894 A | 3/1957 | Lovell et al. | |
| 2,944,017 A | 7/1960 | Cotton et al. | |
| 3,133,132 A | 5/1964 | Loeb et al. | |
| 3,408,315 A | 10/1968 | Paine et al. | |
| 4,196,070 A | 4/1980 | Chao et al. | |
| 4,248,924 A | 2/1981 | Okita | |
| 4,340,479 A | 7/1982 | Pall | |
| 4,340,480 A | 7/1982 | Pall et al. | |
| 4,340,482 A | 7/1982 | Sternberg | |
| 4,450,126 A | 5/1984 | Kesting | |
| 4,454,085 A | 6/1984 | Schindler et al. | |
| 4,873,037 A * | 10/1989 | Chau et al. | 264/49 |
| 4,945,125 A * | 7/1990 | Dillon et al. | 524/427 |
| 5,064,593 A | 11/1991 | Tamaru et al. | |
| 5,066,683 A * | 11/1991 | Dillon et al. | 521/54 |
| 5,157,058 A * | 10/1992 | Dillon et al. | 521/134 |
| 5,545,475 A * | 8/1996 | Korleski | 428/306.6 |
| 5,980,799 A | 11/1999 | Martakos et al. | |
| 6,110,333 A * | 8/2000 | Spethmann et al. | 204/252 |
| 6,235,377 B1 * | 5/2001 | Dillon et al. | 428/212 |

(Continued)

FOREIGN PATENT DOCUMENTS

CA    1167211 A1    5/1984

(Continued)

OTHER PUBLICATIONS

Extended European Search Report dated Mar. 22, 2010 on EP Application No. 08 01 5490.

*Primary Examiner* — Ana M Fortuna
(74) *Attorney, Agent, or Firm* — Sughrue Mion, PLLC

(57) ABSTRACT

To provide a crystalline polymer microporous film including: a laminate consisting of two or more crystalline polymer layers formed of crystalline polymers; and multiple pores penetrating through the laminate in the thickness direction thereof, wherein an average pore size of each of the crystalline polymer layer changes along the thickness thereof.

13 Claims, 7 Drawing Sheets

U.S. PATENT DOCUMENTS

| | | | |
|---|---|---|---|
| 6,596,112 B1 * | 7/2003 | Ditter et al. | 156/182 |
| 6,827,737 B2 * | 12/2004 | Hill et al. | 623/1.4 |
| 6,852,223 B2 * | 2/2005 | Huang et al. | 210/500.36 |
| 7,060,210 B2 * | 6/2006 | Roberts | 264/49 |
| 2002/0136945 A1 | 9/2002 | Call et al. | |

FOREIGN PATENT DOCUMENTS

| | | |
|---|---|---|
| DE | 3003400 A1 | 8/1980 |
| DE | 3138525 A1 | 4/1983 |
| JP | 55-99934 A | 7/1980 |
| JP | 58-37842 A | 3/1983 |
| JP | 58-91732 A | 5/1983 |
| JP | 63-48562 A | 9/1988 |
| JP | 3-179038 A | 8/1991 |
| JP | 3-179039 A | 8/1991 |
| JP | 4-68966 A | 11/1992 |
| JP | 4-351645 A | 12/1992 |
| JP | 7-292144 A | 11/1995 |

* cited by examiner

US 8,011,518 B2

CRYSTALLINE POLYMER MICROPOROUS FILM, MANUFACTURING METHOD OF THE SAME, AND FILTRATION FILTER

BACKGROUND OF THE INVENTION

1. Field of the Invention

The present invention relates to a crystalline polymer microporous film with a high filtration efficiency for use for microfiltration of gas, liquid, etc., a manufacturing method of the same, and a filtration filter.

2. Description of the Related Art

Microporous films have been traditionally known and are finding increasing applications for filtration filters, etc (R. Kesting, Synthetic Polymer Membrane, McGraw Hill). Examples are, for example, microporous films made of cellulose ester (see U.S. Pat. Nos. 1,421,341, 3,133,132 and 2,944,017; and Japanese Patent Application Publication (JP-B) Nos. 43-15698, 45-3313, 48-39586 and 48-40050), microporous films made of aliphatic polyamide (see U.S. Pat. Nos. 2,783,894, 3,408,315, 4,340,479, 4,340,480 and 4,450,126; Germany Patent No. 3138525; and Japanese Patent Application Laid-Open (JP-A) No. 58-37842), microporous films made of polyfluorocarbon (see U.S. Pat. Nos. 4,196,070 and 4,340,482; and JP-A Nos. 55-99934 and 58-91732), and microporous films made of polypropylene (see West Germany Patent No.3003400).

These microporous films are used for the filtration and sterilization of water for pharmaceutical preparations, production processes for pharmaceutical preparations, foods, etc., as well as washing water for electronics. In recent years, they are used in a variety of fields and so their consumption is increasing. In particular, microporous films receive attention that can capture particles with high reliability. Among them, microporous films formed of crystalline polymer offer excellent chemical resistance, and in particular, crystalline polymer microporous films made of polytetrafluoroethylene (hereinafter may be referred to as "PTFE") offer excellent heat resistance and chemical resistance; therefore, the demand for PTFE microporous films is significantly growing.

The permeation rate of a microporous film per unit area is generally small (i.e., filtration life is short). For industrial applications, this necessitates the use of a large number of filtration units arranged in series in order to ensure an increased film area. Thus it is necessary to increase filtration life in order to reduce costs associated with filtration. As microporous films that can effectively prevent flow rate reduction due to clogging, for example, asymmetric films have been proposed in which the pore size gradually decreases from the inlet side to outlet side (see JP-B Nos. 55-6406 and 04-68966).

Also proposed are, for example, a multilayered polytetrafluoroethylene porous film consisting of a small-pore size filtration layer and a support layer with a pore size greater than that of the filtration layer (see JP-A No. 04-351645), and a porous film fabricated by applying an emulsion of polytetrafluoroethylene onto a polytetrafluoroethylene sheet and by drawing the sheet (see JP-A No. 07-292144).

Unfortunately, in JP-A Nos. 04-351645 and 07-292144, cracks or other defects are more likely occur on the resultant microporous film after coating and drying processes. Moreover, since small pore size is obtained only around the film surface, it offers limited filtration life.

Furthermore, according to JP-A Nos. 03-179038 and 03-179039, it is possible to fabricate a microporous film consisting of a small-pore size filtration layer and a large-pore size support layer, which are integrally bonded together completely, by multiple-sheet extrusion. In this microporous film, however, clogging easily occurs at the boundary between the filtration layer and support layer, i.e., at a portion where pore size change is discontinuous.

JP-B No. 63-48562 discloses a method of manufacturing a thin film with asymmetric pore size by pressing a thin ethylene tetrafluoride resin film while heating both surfaces thereof at different temperatures. With this proposal, however, pores of desired shape cannot be successfully obtained since the heating temperature is low—from 250° C. to the melting point of ethylene tetrafluoride resin.

Accordingly, the current situation is that demand is growing for a crystalline polymer microporous film consisting of two or more crystalline polymer layers, which enables efficient capturing of microparticles without clogging and thus gives longer filtration life, a manufacturing method of the crystalline polymer microporous film, and a filtration filter including the crystalline polymer microporous film.

BRIEF SUMMARY OF THE INVENTION

It is an object of the present invention to provide a crystalline polymer microporous film having a laminate consisting of two or more crystalline polymer layers and having multiple pores penetrating through the laminate, wherein the average pore size of each of the crystalline polymer layers changes along its thickness, which crystalline polymer microporous film enables efficient capturing of microparticles without clogging and thus gives longer filtration life; a manufacturing method of the microporous film; and a filtration filter including the crystalline polymer microporous film.

Means of solving the foregoing problems are as follows:

<1> A crystalline polymer microporous film including:

a laminate consisting of two or more crystalline polymer layers formed of crystalline polymers; and multiple pores penetrating through the laminate in the thickness direction thereof, wherein an average pore size of each of the crystalline polymer layer changes along the thickness thereof.

<2> The crystalline polymer microporous film according to <1>, wherein the average pore size changes in the thickness direction in a manner of continuous increasing or continuous decreasing.

<3> The crystalline polymer microporous film according to one of <1> and <2>, wherein the crystalline polymer layers have different opening diameters.

<4> The crystalline polymer microporous film according to any one of <1> to <3>, wherein the laminate consists of three or more of the crystalline polymer layers, and the crystalline polymer layer whose maximum average pore size is smaller than any other crystalline polymer layer is placed inside the laminate.

<5> The crystalline polymer microporous film according to any one of <1> to <4>, wherein the crystalline polymer layers are formed of different crystalline polymers.

<6> The crystalline polymer microporous film according to <5>, wherein the crystalline polymer layers are formed of crystalline polymers with different number-average molecular weights.

<7> The crystalline polymer microporous film according to any one of <1> to <6>, wherein the crystalline polymers are each made of polytetrafluoroethylene.

<8> A manufacturing method of a crystalline polymer microporous film including:

laminating two or more crystalline polymer layers to form a laminate, the crystalline polymer layers formed of different crystalline polymers;

heating one surface of the laminate to establish a temperature gradient in the thickness direction thereof, and stretching the laminate in which the temperature gradient has been established.

<9> The manufacturing method according to <8>, wherein the crystalline polymers have different number-average molecular weights.

<10> The manufacturing method according to one of <8> and <9>, wherein the crystalline polymers are each made of polytetrafluoroethylene.

<11> The manufacturing method according to any one of <8> to <10>, wherein the stretching is uniaxial stretching.

<12> The manufacturing method according to any one of <8> to <10>, wherein the stretching is biaxial stretching.

<13> A filtration film including the crystalline polymer microporous film according to any one of <1> to <7>.

<14> The filtration filter according to <13>, wherein a surface of the crystalline polymer microporous film, which surface has a larger average pore size than the other surface, is used as a filtration surface.

The crystalline polymer microporous film of the present invention includes a laminate consisting of two or more crystalline polymer layers formed of crystalline polymers; and multiple pores penetrating through the laminate in the thickness direction thereof, wherein an average pore size of each of the crystalline polymer layer changes along the thickness thereof. This enables efficient capturing of microparticles without clogging and thereby extended filtration life can be realized.

The manufacturing method of the present invention for manufacturing a crystalline polymer microporous film includes a laminate formation step, an asymmetric heating step, and a stretching step.

In the laminate formation step a laminate is formed by laminating two or more crystalline polymer layers formed of different crystalline polymers. In the asymmetric heating step one surface of the laminate is heated to establish a temperature gradient in the thickness direction of the laminate. In the stretching step the laminate is stretched. In this way a crystalline polymer microporous film can be efficiently manufactured that is capable of efficient capturing of microparticles without clogging and thus gives longer filtration life.

The filtration filter of the present invention includes the crystalline polymer microporous film of the present invention. Efficient capturing of microparticles can be achieved by using a large-pore size surface (front surface) of the filter as an inlet side. Moreover, since the filter has a large specific area, microparticles are efficiently removed by adsorption or attachment before reaching pores of minimum diameters, thereby greatly extending its filtration life.

DETAILED DESCRIPTION OF THE INVENTION (Crystalline Polymer Microporous Film)

A crystalline polymer microporous film of the present invention includes a laminate consisting of two or more crystalline polymer layers with multiple pores penetrating through the laminate along the thickness thereof, and where necessary, further includes additional components.

The laminate refers to "multilayer structure" formed by bonding together or depositing two or more crystalline polymer layers, and thus does not refer to "single-layer structure."

That the laminate has "multilayer structure" means there is a boundary between adjacent crystalline polymer layers, clearly distinguishing over "single-layer structure" where no boundary is formed. The presence of the boundary formed between crystalline polymer layers can be determined for instance by observing a cross section of the crystalline polymer microporous film cut along its thickness, by use of an optical microscope or scanning electron microscope. Note that the laminate encompass a stretched laminate.

In the present invention, the average pore size of pores in each of the crystalline polymer layers changes in the thickness direction. This enables efficient capturing of microparticles without clogging and thereby increases filtration life.

The manner in which the average pore size changes in the thickness direction is preferably either continuous increase or continuous decrease; discontinuous increase or discontinuous decrease may be included partially.

The description "the average pore size of pores in each of the crystalline polymer layers changes in the thickness direction" or equivalent description means that in a graph of average pore size (D) of pores vs. distance (d) from the front surface of the crystalline polymer microporous film (i.e., depth as measured from the front surface), a single continuous line can be drawn for each crystalline polymer layer in a region from the front surface (d=0) to the back surface (d=film thickness), and the gradient of the line (dD/dt) is either negative (pore size decreases) or positive (pore size increases), with a case where the line levels off (gradient=0; pore size does not change) being specifically excluded.

It is most preferable that the average pore size of pores in each crystalline polymer layer continuously decrease from the front surface toward back surface.

In the present invention, a surface of the crystalline polymer microporous film, which surface is opposite to a surface heated for asymmetric heating, is referred to as "front surface", while a surface which heated for asymmetric heating and thus has a smaller average pore size than the other surface (front surface) is referred to as "back surface." It should be noted, however, that these terms are for descriptive purposes only. Thus, either surface of a non-heated, multilayer polytetrafluoroethylene film (laminate) may be heated so that it serves as "back surface."

Figure 1:
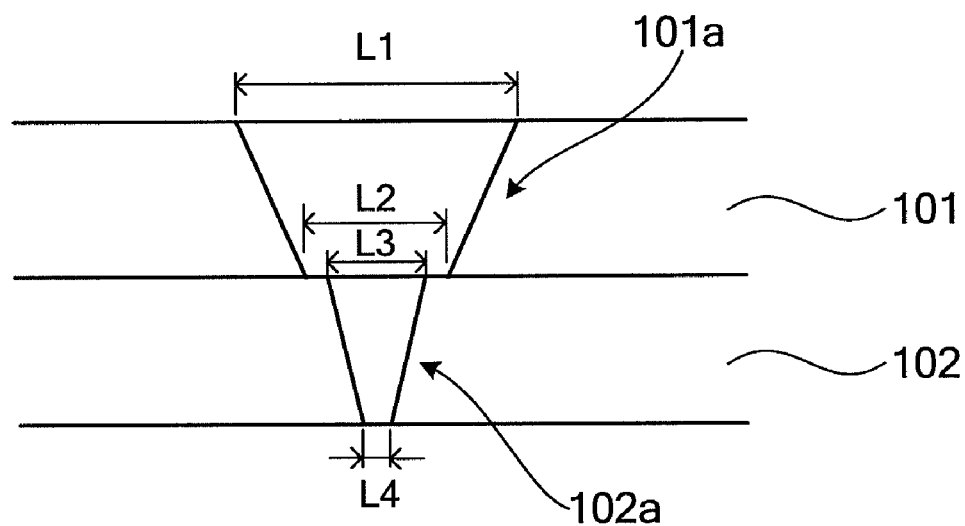
FIG. 1 is a schematic illustration of an example of a two-layered crystalline polymer microporous film according to the present invention.

In a two-layered crystalline polymer microporous film of the present invention consisting of crystalline polymer layers 101 and 102, the pore size of each of pores 101a and 102a changes (continuously decreases) in the thickness direction of the crystalline polymer layers, as shown in FIG. 1. When seen as a two-layered crystalline polymer microporous film, the pore size changes (decreases in stages) in the thickness direction.

Figure 2:
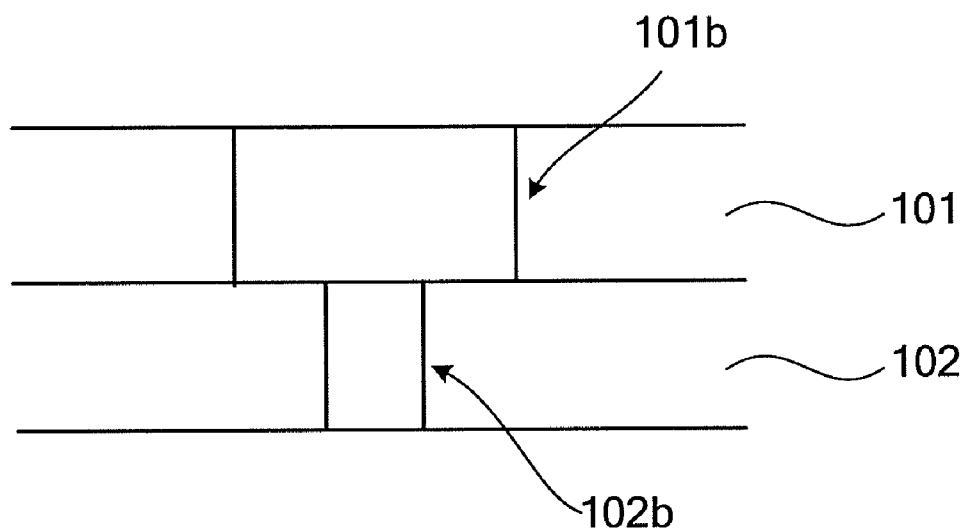
FIG. 2 is a schematic illustration of an example of a conventional two-layered crystalline polymer microporous film.

By contrast, in a conventional two-layered crystalline polymer microporous film consisting of crystalline polymer layers 101 and 102, the pore size of each of pores 101b and 102b does not change in the thickness direction of the crystalline polymer layers, as shown in FIG. 2. When seen as a two-layered crystalline polymer microporous film, the pore size changes (decreases in stages) in the thickness direction.

Figure 3:
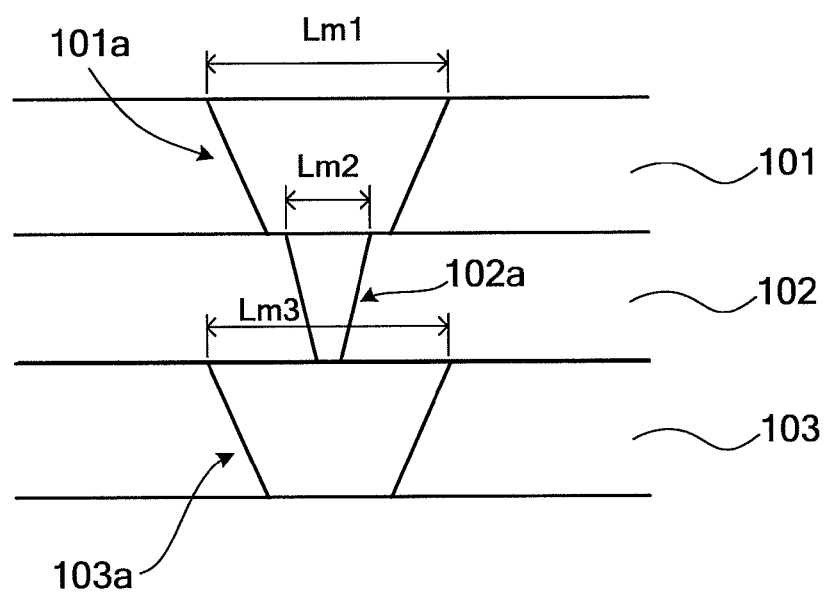
FIG. 3 is a schematic illustration of an example of a three-layered crystalline polymer microporous film according to the present invention.

In a three-layered crystalline polymer microporous film of the present invention consisting of crystalline polymer layers 101, 102 and 103, the pore size of each of pores 101a, 102a and 103a changes (continuously decreases) in the thickness direction of the crystalline polymer layers, as shown in FIG. 3. When seen as a three-layered crystalline polymer microporous film, the pore size changes (decreases in stages) in the thickness direction.

Figure 4:
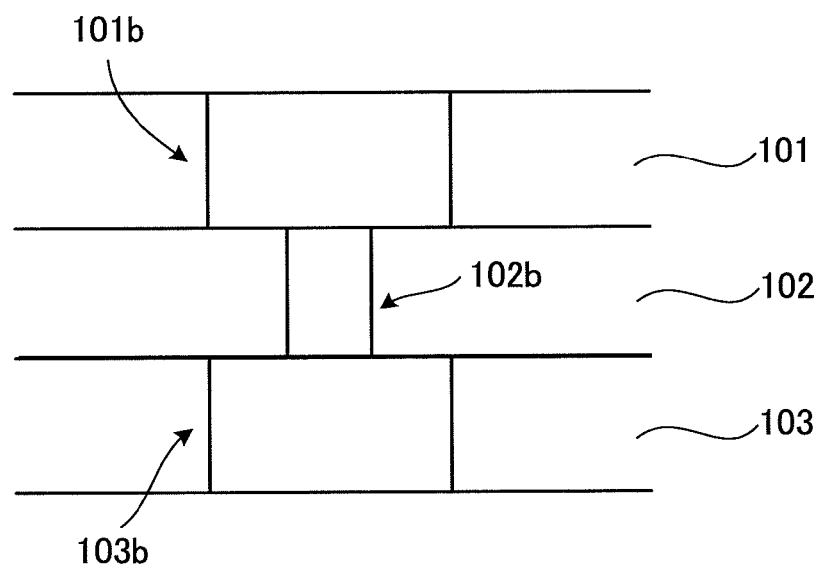
FIG. 4 is a schematic illustration of an example of a conventional three-layered crystalline polymer microporous film.

In a conventional three-layered crystalline polymer microporous film consisting of crystalline polymer layers 101, 102 and 103, the pore size of each of pores 101b, 102b and 103b does not change in the thickness direction of the crystalline polymer layers, as shown in FIG. 4. When seen as a three-layered crystalline polymer microporous film, the pore size partially changes in stages in the thickness direction.

It is preferable that the crystalline polymer layers in the crystalline polymer microporous film have different opening diameters. More specifically, as shown in FIG. 1, when the pore sizes of the pores 101a and 102a in the crystalline polymer layers 101 and 102 continuously decrease in the thickness direction of the crystalline polymer layers, opening diameters L1 and L2 satisfy the relationship L1>L2, and opening diameters L3 and L4 satisfy the relationship L3>L4.

In this case, in each crystalline polymer layer, the average pore size in the front surface is preferably 5 times to 30 times, more preferable 10 times to 25 times, further preferably 15 times to 20 times the average pore size in the back surface.

In the case of a laminate consisting of three or more crystalline polymer layers, it is preferable that a crystalline polymer layer whose maximum average pore size is smaller than any other crystalline polymer layer be provided inside the laminate. This protects the crystalline polymer layer, which has a minimum average pore size and thus affects capturing most significantly, from physical fracture factors such as friction and scratches, thereby stabilizing capturing performance.

Regarding the pores 101a, 102a, 103a provided in the three-layered crystalline polymer porous film consisting of crystalline polymer layers 101, 102 and 103, the crystalline polymer layer 102, which has a maximum average pore size Lm2 that is smaller than the other maximum average pore sizes Lm1 and Lm3, is provided inside the crystalline polymer porous film (laminate), as shown in FIG. 3.

The average pore size can be determined as follows: An SEM image (1,000× to 5,000×) of a film surface is taken with, for example, a scanning electron microscope (Hitachi, model S-4000; deposition=Hitachi E-1030 sputter, both manufactured by Hitachi Ltd.). The SEM image was scanned with an image processor (Hardware: TV Image Processor TVIP-4100 II, manufactured by Nippon Avionics Co., Ltd.; control software: TV Image Processor Image Command 4198, manufactured by Ratoc System Engineering Co., Ltd.) to obtain an image of crystalline polymer fibers. By processing this image, an average pore size can be found.

-Crystalline Polymer-

As used herein, "crystalline polymer" means a polymer having in its molecular structure a crystalline region where long-chain molecules are regularly aligned, and a non-crystalline region where long-chain molecules are not regularly aligned. This kind of polymer becomes crystalline by physical treatment. For example, when a transparent polyethylene film is stretched by application of external force, it becomes cloudy at the beginning of stretching. This is because the polymer molecules are aligned lengthwise along one direction by application of external force, so that the polyethylene film becomes crystalline.

The crystalline polymer is not specifically limited and can be appropriately selected according to the intended purpose; examples include, for example, polyalkylenes, polyesters, polyamides, polyethers, and liquid crystalline polymers. Specific examples thereof include, for example, polyethylene, polypropylene, nylon, polyacetal, polybutylene terephthalate, syndiotactic polystyrene, polyphenylene sulfide, polyether ether ketone, wholly aromatic polyamides, wholly aromatic polyesters, fluorine resins, and polyether nitrile.

Among them, polyalkylenes (e.g., polyethylene and polypropylene) are preferable in view of their chemical resistance and handleablility; fluorine polyalkylenes in which some or all of the hydrogen atoms attached to the alkylene groups of polyalkylenes are substituted with fluorine atoms are more preferable, with polytetrafluoroethylene (PTFE) being most preferable.

The density of polyethylene varies with its branching degree; therefore, polyethylene is classified into two types depending on the density: low-density polyethylene (LDPE) which has a high branching degree and thus has a low degree of crystallinity, and high-density polyethylene (HDPE) which has a low branching degree and thus has a high degree of crystallinity. In the present invention, both types can be employed. However, HDPE is most preferable in view of crystallinity control.

As the above-noted polytetrafluoroethylene, polytetrafluoroethylene prepared by emulsion polymerization can be generally employed. It is preferable to use powder polytetrafluoroethylene prepared by coagulation of aqueous dispersion particles of polytetrafluoroethylene obtained by emulsion polymerization.

The polytetrafluoroethylene is not specifically limited and can be appropriately selected according to the intended purpose; commercially available products can be employed. Examples thereof include, for example, POLYFLON PTFE F-104, POLYFLON PTFE F-201, POLYFLON PTFE F-205, POLYFLON PTFE F-207, and POLYFLON PTFE F-301 (Daikin Industries, Ltd.); Fluon PTFE CD1, Fluon PTFE CD141, Fluon PTFE CD145, Fluon PTFE CD123, Fluon PTFE CD076, and Fluon PTFE CD090 (Asahi Glass Co., Ltd.); and Teflon® PTFE 6-J, Teflon® PTFE 62XT, Teflon® PTFE 6C-J, and Teflon® PTFE 640-J (DuPont-Mitsui Fluorochemicals Co., Ltd.). Among them, F-104, CD-1, CD141, CD145, CD123 and 6-J are preferable, F-104, CD1, CD123 and 6-J are more preferable, and CD123 is most preferable.

Preferably, the above crystalline polymers each have a glass transition temperature of 40° C. to 400° C., more preferably 50° C. to 350° C.

Preferably, the above crystalline polymers each have a weight-average molecular weight of 1,000 to 100,000,000.

Preferably, the above crystalline polymers each have a number-average molecular weight of 500 to 50,000,000, more preferably 1,000 to 10,000,000.

The number-average molecular weight can be measured for instance by gel permeation chromatography (GPC). However, since PTFE is insoluble in solvents, it is preferable to find the number-average molecular weight by measuring heat of crystallization (ΔHc: cal/g) by DSC measurement, and by substituting the obtained value into Equation: $Mn=2.1\times10^{10}\times \Delta Hc^{-5.16}$.

It is preferable that the crystalline polymer layers in the crystalline polymer microporous film have different crystalline polymers.

As used herein, "different crystalline polymers" means that the crystalline polymers are made of different materials, have different number-average molecular weights, have different degrees of crystallinity, etc.

The crystalline polymers may be made of the same or different materials; when the crystalline polymers are made of the same material, they may have either different number-average molecular weights or different degrees of crystallinity.

When crystalline polymers made of different materials are to be used, PTFE and polyethylene can be employed, for example.

When crystalline polymers with different number-average molecular weights are to be used, the different is 1,000,000 or greater in the case of PTFE, for example.

When crystalline polymers with different degrees of crystallinity are to be used, the difference is 5% or greater in the case of PTFE, for example.

The degree of crystallinity can be measured for instance by wide-angle X-ray diffraction, NMR, IR spectroscopy, DSC or density measurement, or in accordance with the method described in "Fluororesin Handbook" T. Satokawa, The Nikkan Kogyo Shimbun, Ltd., p. 45.

The thickness of the crystalline polymer microporous film is preferably 1 μm to 300 μm, more preferably 5 μm to 100 μm, most preferably 10 μm to 80 μm.

(Manufacturing Method of Crystalline Polymer Microporous Film)

The manufacturing method of the present invention for manufacturing a crystalline polymer microporous film includes at least a laminate formation step, an asymmetric heating step and a stretching step, and where necessary, further includes additional step(s).

-Laminate Formation Step-

The laminate formation step is a step of forming a laminate by laminating two or more crystalline polymer layers consisting of different crystalline polymers.

The different crystalline polymers are appropriately selected from those described above according to the intended purpose.

The laminate formation step is not specifically limited and can be carried out in accordance with a known paste extrusion method as described below.

Firstly, two or more mixtures (pastes) each consisting of a crystalline polymer and an extrusion aid are laminated to produce a pre-molded article, which is then stretched by application of pressure with a paste extruder to produce a non-heated multilayered crystalline polymer film (laminate). As the extrusion aid, it is preferable to use a liquid lubricant, for example, solvent naphtha or white oil. Alternatively, commercially available extrusion aids may be used; examples include, for example, "ISOPER" series, hydrocarbon oils manufactured by Esso Oil. The added amount of such an extrusion aid is preferably 20 parts by mass to 30 parts by mass per 100 parts by mass of the crystalline polymer.

The paste extrusion is preferably carried out at 50° C. to 80° C. The shape of the extruded article is not specifically limited and can be appropriately determined according to the intended purpose. In general, rod shape or rectangular shape is preferable. The extruded article is then stretched into a film by application of pressure. For example, the stretching is carried out by calendering at a rate of 50 m/min with a calender roller. The stretching temperature is generally set to 50° C. to 70° C. Thereafter, the film is heated for removal of the extrusion aid to form a non-heated multilayered crystalline polymer film. The heating temperature is determined depending on the types of crystalline polymers used; it is preferably 40° C. to 400° C., more preferably 60° C. to 350° C. In the case of polytetrafluoroethylene, for example, the heating temperature is preferably 150° C. to 280° C., more preferably 200° C. to 255° C. The heating can be carried out by passing the film through an air heating/drying furnace. The thickness of the non-heated multilayered crystalline polymer film produced in this way can be adjusted according to the intended thickness of the final crystalline polymer microporous film. When the non-heated film is to be stretched in a subsequent step, the thickness needs to be adjusted while taking thickness reduction associated with stretching into consideration.

Note that the non-heated multilayer crystalline polymer film can be manufactured by reference to "POLYFLON Handbook" (Daikin Industries Ltd. (1983)).

With reference to FIGS. 5 to 8, an example of a manufacturing method of the present invention for manufacturing a crystalline polymer microporous film is explained.

Figure 7:
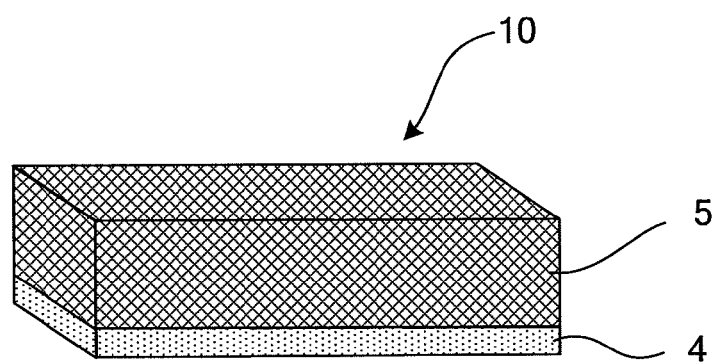
FIG. 7 shows an example of a pre-molded article.

As shown in FIG. 7, a pre-molded article 10 is fabricated that consists of a first layer 4 containing a PTFE fine powder 1 and of a second layer 5 containing a PTFE fine powder 2.

These layers are produced from pastes 1 and 2, each of which is prepared by adding a liquid lubricant (e.g., solvent naphtha or white oil) into a PTFE fine powder produced by coagulation of aqueous dispersion PTFE particles with an average primary particle diameter of 0.2 μm to 0.4 μm, which particles have been prepared by emulsion polymerization. The added amount of the liquid lubricant varies depending on its type, mold conditions, etc. In general, it is added in an amount of 20 parts by mass to 35 parts by mass per 100 parts by mass of the PTFE fine powder. Colorants and other agents may be added as needed.

Figure 5:
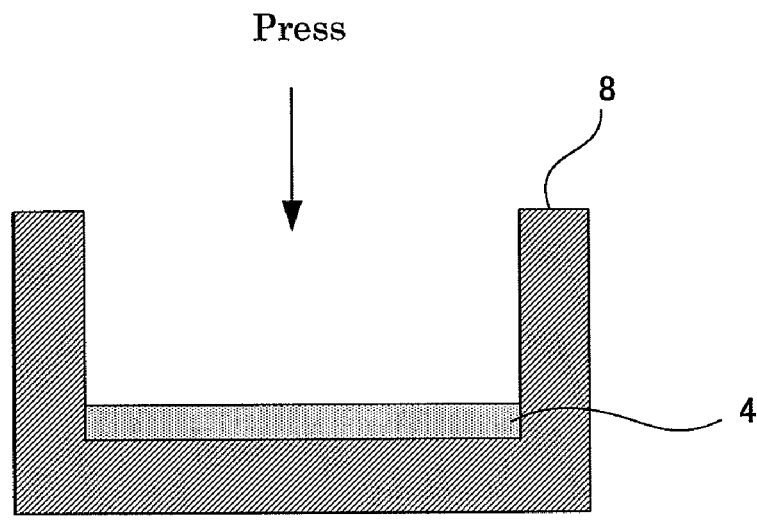
FIG. 5 shows a step of a manufacturing method of the present invention for manufacturing a crystalline polymer microporous film.

The paste 1 that contains the PTFE fine powder 1 for the first layer is placed in layer form inside a box-shaped lower mold 8 shown in FIG. 5, and a upper mold (not shown) is moved in the arrow direction and pressed against the paste 1. In this way the paste 1 is compressed and thereby the first layer 4 is formed.

Figure 6:
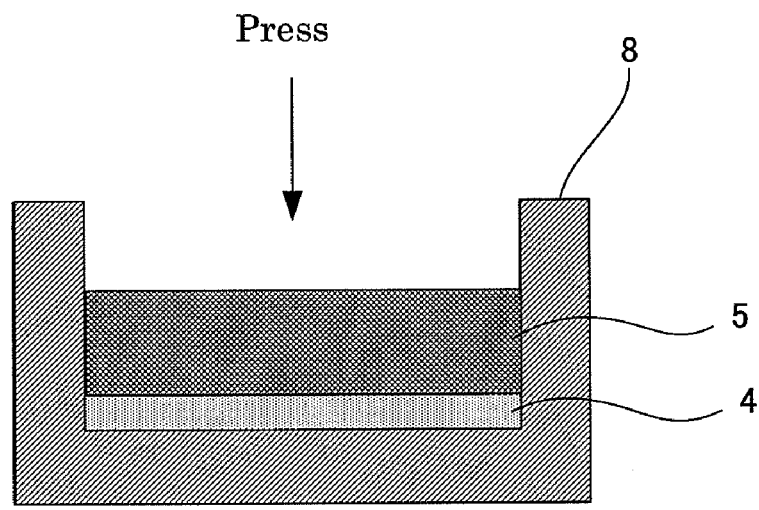
FIG. 6 shows another step of a manufacturing method of the present invention for manufacturing a crystalline polymer microporous film.

Next, the upper mold is removed and the paste 2, which contains the PTFE fine powder 2 for the second layer, is placed onto the first layer 4. In the same manner as described above, the paste 2 is compressed by the upper mold to form the second layer 5 on the first layer 4 as shown in FIG. 6. In this way the pre-molded article 10 as shown in FIG. 7 is obtained that has a dimension enabling it to be housed in the cylinder of a paste extruder.

Figure 8:
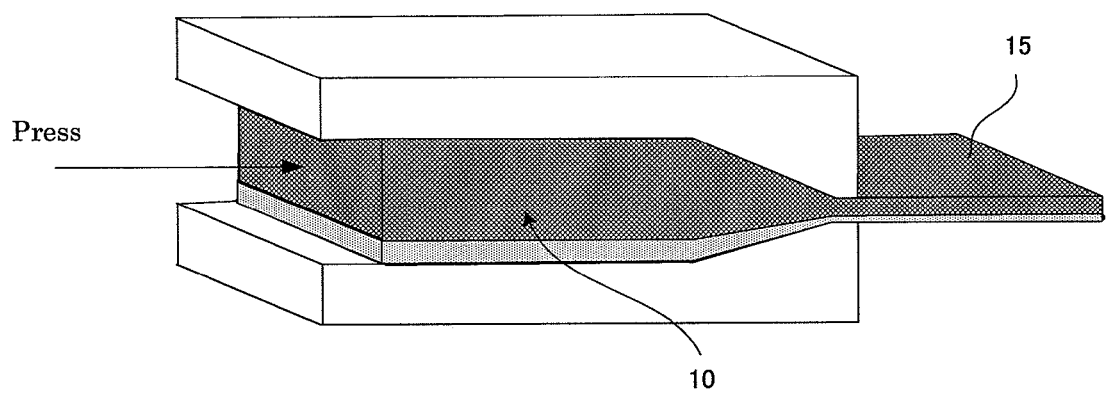
FIG. 8 shows still another step of a manufacturing method of the present invention for manufacturing a crystalline polymer microporous film.

The pre-molded article 10 is then placed in the cylinder of the paste extruder shown in FIG. 8, and is pressed in the arrow direction by use of a pressing means (not shown). The cross section of the cylinder of the paste extruder shown in FIG. 8, cut along the direction perpendicular to its axis, is a 50 mm×100 mm rectangular. One end of the cylinder is tapered to form a 50 mm×5 mm nozzle as a discharge port.

In this way, a non-heated multilayered polytetrafluoroethylene film (laminate) 15 is fabricated in which the first layer 4 and second layer 5 are integrally bonded together completely and in which each layer has a uniform thickness. It has already been confirmed by use of a stereo microscope that the thicknesses of layers in the laminate are equal to those of the corresponding layers in the pre-molded article.

-Asymmetric Heating Step-

The asymmetric heating step is a step of heating one surface of the resultant laminate so as to establish a temperature gradient therein in the thickness direction.

As used herein, "asymmetric heating" means heating a laminate consisting of two or more crystalline polymer layers formed of crystalline polymers at a temperature from the melting point of that laminate to the melting point plus 15° C.

As used herein, "non-heated laminate" refers to a laminate that has not yet been subjected to asymmetric heating. Moreover, as used herein, "heated laminate" refers to a laminate that has been heated at a temperature corresponding to the melting point of that laminate or higher.

The melting point of a non-heated laminate is a temperature corresponding to the peak of an endotherm curve that appears upon differential scanning calorimetry of the non-heated laminate. The melting points of the heated laminate and non-heated laminate vary depending on the type, number-average molecular weight, etc., of crystalline polymers used; however, the melting point is preferably 50° C. to 450° C., more preferably 80° C. to 400° C.

An exemplary case is as follows. For example, in the case of polytetrafluoroethylene, a heated laminate has a melting point of about 324° C. and a non-heated laminate has a melting point of about 345° C. Accordingly, in order to obtain a semi-heated laminate which consists of mixtures of crystalline polymer layers with melting points of about 324° C. and 345° C. in the case of polytetrafluoroethylene film, it is preferably heated at 324° C. to 360° C., more preferably 335° C. to 350° C., for example at 345° C.

As to supply of heat energy in the asymmetric heating step, it is possible to employ any of a continuous heat energy supply method and an intermittent heat energy supply method. By definition of asymmetric heating, it is necessary to establish a temperature difference between the front and back surfaces of the laminate. By supplying energy intermittently, it is possible to avoid temperature increase at the back surface. When heating the front surface continuously, the back surface is cooled at the same time so as to retain the temperature gradient.

The method of heat energy supply is not specifically limited and can be appropriately selected according to the intended purpose; examples are (1) blowing heated air to the laminate, (2) bringing the laminate in contact with a heating medium, (3) bringing the laminate in contact with a heating member, (4) irradiating the laminate with infrared radiation, and (5) heating the laminate with an electromagnetic wave such as microwave. Among them, the methods (3) and (4) are preferable. As the heating member in the method (3), a heating roll is preferable. With such a heating roll, continuous asymmetric heating is enabled in an industrial flow system, and in addition, temperature control and device maintenance are simple. The temperature of the heating roll can be set to a temperature for the above-mentioned semi-heated laminate. The time during which the heating roll is in contact with the film is so selected that intended asymmetric heating is sufficiently effected; it is preferably 30 seconds to 120 seconds, more preferably 45 seconds to 90 seconds, still more preferably 60 seconds to 80 seconds.

The method of irradiation with infrared radiation in the above (4) is not specifically limited and can be appropriately selected according to the intended purpose. A general definition of infrared radiation can be found in "Jitsuyou Sekigaisen" (practical usage of infrared radiation), published by Ningentorekishisha (1992). As used herein, "infrared radiation" means electromagnetic waves whose wavelengths are 0.74 μm to 1,000 μm. In the infrared radiation band, the region from 0.74 μm to 3 μm in wavelength corresponds to near-infrared radiation, and the region from 3 μm to 1,000 μm in wavelength corresponds to far-infrared radiation.

In the present invention it is preferable to establish a great temperature difference between the front and back surfaces of a non-heated laminate, and therefore, far-infrared radiation is preferably used because it is advantageous for heating of surface layer.

The infrared irradiation device is not specifically limited as long as it can radiate at a desired wavelength and can be appropriately selected according to the intended purpose. In general, light bulbs (halogen lamps) can be employed for near-infrared radiation, and heat generators such as ceramic, quarts, and metal oxide surfaces can be employed for far-infrared radiation.

With infrared radiation, it is possible to effect continuous asymmetric heating in an industrial flow system, and in addition, temperature control and device maintenance are simple. Moreover, since heating is achieved in a non-contact manner, the laminate remains clean and no defects (e.g., fuzz) occur.

The film surface temperature by infrared irradiation can be controlled by adjustment of the output level of the infrared irradiation device, the distance between the device and film surface, irradiation time (film conveying speed), and/or atmosphere temperature, and can be set to a temperature for the above semi-heated laminated. The temperature is preferably 324° C. to 380° C., more preferably 335° C. to 360° C. If the surface temperature is less than 324° C., the crystalline does not change and thus it may result in failure to control pore size. If the surface temperature is greater than 380° C., the whole laminate melts and undergoes excessive shape change or it may result in thermal decomposition of crystalline polymers.

The irradiation time is not specifically limited and is so selected that intended asymmetric heating is sufficiently effected; it is preferably 30 seconds to 120 seconds, more preferably 45 seconds to 90 seconds, still more preferably 60 seconds to 80 seconds.

Infrared radiation for asymmetric heating may be carried out either continuously or intermittently.

Regarding the temperature gradient in the laminate in the thickness direction, the temperature difference between the front and back surfaces is preferably 30° C. or more, more preferably 50° C. or more.

When the back surface of the laminate is heated continuously, it is preferable to cool the front surface simultaneously in order to retain the temperature gradient between the front and back surfaces.

The method of cooling the front surface is not specifically limited and can be appropriately selected according to the intended purpose, and a variety of cooling methods can be employed; for example, cooling can be achieved by blowing cold air to the front surface, bringing a cooling medium or cooled material to the front surface, or allowing the laminate to stand to cool. However, the cooling method that involves bringing a cooling medium to the front surface is undesirable since the contact surface is heated by far-infrared radiation.

When the laminate is heated intermittently in the asymmetric step, it is preferable to heat and cool the back surface intermittently so as to avoid temperature increase in the surface.

-Stretching Step-

The stretching step is a step of stretching a laminate in which a temperature gradient has been established.

It is preferable that stretching be carried out both along the length and width of the laminate. The laminate may be stretched along the length and width either at different times or at the same time (biaxially).

When the laminate is stretched along the length and width at different times, it is preferable that widthwise stretching be preceded by lengthwise stretching.

It is preferable that the laminate be stretched along its length by 4 times to 100 times the original length, more preferably 8 times to 90 times, still more preferably 10 times to 80 times. The temperature for lengthwise stretching is preferably 100° C. to 300° C., more preferably 200° C. to 290° C., most preferably 250° C. to 280° C.

It is preferable that the laminate be stretched along its width by 10 times to 100 times the original width, more preferably 12 times to 90 times, still more preferably 15 times to 70 times, most preferably 20 times to 40 times. The temperature for widthwise stretching is preferably 100° C. to 300° C., more preferably 200° C. to 290° C., most preferably 250° C. to 280° C.

It is preferable that the laminate be stretched by 50 times to 300 times the original area, more preferably 75 times to 290 times, still more preferably 100 times to 280 times. Upon stretching, the crystalline polymer film may be pre-heated to a temperature not greater than the stretching temperature.

Where necessary, thermal fixation may be effected after stretching. In general, the thermal fixation temperature is preferably not less than the stretching temperature, but not greater than the melting point of the crystalline polymer.

A crystalline polymer microporous film of the present invention can be used in many applications, particularly as a filtration filter to be described below.

(Filtration Filter)

A filtration filter of the present invention is characterized that it includes a crystalline polymer microporous film of the present invention.

When the crystalline polymer microporous film of the present invention is used as a filtration filter, it is used such that its front surface (surface with a large average pore size) becomes an inlet side. Specifically, the surface with large pore sizes serves as a filtration surface of the filter. This enables efficient capturing of microparticles.

Moreover, since the crystalline polymer microporous film of the present invention has a large specific surface, microparticles that entered from the film surface are removed by adsorption or attachment before they reach pores of minimum diameters. Accordingly, clogging hardly occurs and thereby a high filtration efficiency can be retained for a long period of time.

The filtration filter of the present invention realizes a filtration flow rate of at least 5 ml/cm$^2$·min when filtration is carried out at a differential pressure of 0.1 kg/cm$^2$.

The filtration filter of the present invention is preferably folded into a pleat. This advantageously increases the effective surface area of filters for filtration per unit cartridge.

Since the filtration filter having the crystalline polymer microporous film of the present invention features such a high filtration performance and longer life, the filtration device can be made small. In a conventional filtration device, the problem of short filtration life has been overcome by arranging a large number of filtration units in series. With the filtration filter of the present invention, the number of such filtration units can be significantly reduced; therefore, it is possible to significantly extend the replacement period of filtration filters and to reduce costs and time associated with maintenance.

The filtration filter of the present invention can be used under various circumstances where filtration is needed. It is suitably used for microfiltration of gases, liquids, etc., for example for filtration of corrosive gases and various gases for use in semiconductor industry, and for filtration and sterilization of water for pharmaceutical preparations, production processes for pharmaceutical preparations, foods, etc., as well as washing water for electronics. In particular, since the filtration filter of the present invention has excellent heat resistance and chemical resistance, it can be effectively used for high-temperature filtration and filtration of reactive reagents, where conventional filtration filters cannot be used.

The present invention can provide a crystalline polymer microporous film having a laminate consisting of two or more crystalline polymer layers and having multiple pores penetrating through the laminate, wherein the average pore size of each of the crystalline polymer layers changes along its thickness, which crystalline polymer microporous film can solve problems pertinent in the art and enables efficient capturing of microparticles without clogging and thus gives longer filtration life; a manufacturing method of the microporous film; and a filtration filter including the crystalline polymer microporous film.

EXAMPLES

Hereinafter, the present invention will be described with reference to Examples, which however shall not be construed as limiting the scope of the present invention.

Example 1

<Preparation of Polytetrafluoroethylene Microporous Film>
-Fabrication of Pre-Molded Article- To 100 parts by mass of a crystalline polymer, a fine powder of polytetrafluoroethylene with a number-average molecular weight 1,000,000 ("Fluon PTFE CD1" Asahi Glass Co., Ltd.), was added 27 parts by mass of an extrusion aid, a hydrocarbon oil ("ISOPER M" Esso Oil), to produce Paste 1.

Similarly, to 100 parts by mass of a crystalline polymer, a fine powder of polytetrafluoroethylene with a number-average molecular weight 10,000,000 ("Fluon PTFE CD123" Asahi Glass Co., Ltd.), was added 27 parts by mass of an extrusion aid, a hydrocarbon oil ("ISOPER M" Esso Oil), to produce Paste 2.

Subsequently, Paste 1 and Paste 2 were placed in a lower mold as shown in FIG. 6 such that the thickness ratio (Paste 1/Paste 2) became 4/1, and pressed to form a pre-molded article 10 (see FIG. 7). Note in FIG. 6 that Paste 1 is denoted by reference numeral 5, and Paste 2 is denoted by reference numeral 4.

In subsequent processes, the surface of the pre-molded article at the Paste 1 (5) side was defined as "front surface", and the surface at the Paste 2 (4) side was defined as "back surface."

-Preparation of Non-Heated Film-

The pre-molded article was placed into the cylinder of a paste extrusion mold like that shown in FIG. 8, and extruded to produce a multilayered paste sheet, which was then calendered with a calender roll heated to 60° C. to produce a multilayered polytetrafluoroethylene film. The multilayered polytetrafluoroethylene film was passed through a 250° C. air heating/drying furnace to dry off the extrusion aid. In this way a non-heated multilayered polytetrafluoroethylene film with an average thickness of 100 μm, average width of 150 mm, and specific gravity of 1.55 was prepared.

-Preparation of Semi-Heated Film-

The back surface (Paste 2 side) of the non-heated multilayered polytetrafluoroethylene film was heated at a film surface temperature of 345° C. for 1 minute by near-infrared radiation using a tungsten filament-incorporated halogen heater. In this way a semi-heated film was prepared.

-Preparation of Polytetrafluoroethylene Microporous Film-

The semi-heated film was stretched along its length by 12.5 times the original length by passing it between rolls, and the stretched film was taken up on a take-up roll. The film was pre-heated to 305° C., pinched by clips at both ends, and stretched at 270° C. along its width by 30 times the original width. The stretched film was thermally fixed at 380° C. The stretched film was 260 times as large as the original one. In this way a polytetrafluoroethylene microporous film of Example 1 was prepared.

Example 2

-Preparation of Polytetrafluoroethylene Microporous Film-

A polytetrafluoroethylene microporous film of Example 2 was prepared as in Example 1 except that upon fabrication of a pre-molded article, the thickness ratio was changed to Paste 1/Paste 2/Paste 1=3/1/1 when seen from the front surface.

Example 3

-Preparation of Polytetrafluoroethylene Microporous Film-

A polytetrafluoroethylene microporous film of Example 3 was prepared as in Example 1 except that the back surface of the non-heated multilayered polytetrafluoroethylene film was heated for 1 minute by a roll (surface material SUS316) retained at 350° C.

Comparative Example 1

-Preparation of Polytetrafluoroethylene Microporous Film-

A polytetrafluoroethylene microporous film of Comparative Example 1 was prepared as in Example 1 except that no asymmetric heating was carried out for the non-heated multilayered polytetrafluoroethylene film.

Comparative Example 2

-Preparation of Polytetrafluoroethylene Microporous Film-

A polytetrafluoroethylene microporous film of Comparative Example 2 was prepared as in Example 1 except that the both surfaces of the non-heated multilayered polytetrafluoroethylene film were heated by an oven for 1 minute at 345° C.

Comparative Example 3

-Preparation of Polytetrafluoroethylene Microporous Film-

A polytetrafluoroethylene microporous film of Comparative Example 3 was prepared as in Example 2 except that the both surfaces of the non-heated multilayered polytetrafluoroethylene film were heated by an oven for 1 minute at 345° C.

The polytetrafluoroethylene microporous films prepared in Examples 1 to 3 and Comparative Examples 1 to 3 were measured for their average thickness and average pore size distribution in the thickness direction, as described below.

<Average Thickness>

The thicknesses of the polytetrafluoroethylene microporous films of Examples 1 to 3 and Comparative Examples 1 to 3 were measured using a dial-type thickness gauge (K402B, Anritsu Company). The average thickness was calculated by averaging three thickness values measured at given positions. The results are shown in Table 1.

TABLE 1

|  | Average thickness (μm) |
| --- | --- |
| Ex. 1 | 50 |
| Ex. 2 | 50 |
| Ex. 3 | 50 |
| Comp. Ex. 1 | 50 |
| Comp. Ex. 2 | 50 |
| Comp. Ex. 3 | 50 |

<Measurement of Average Pore Sizes Along the Thickness from the Front Surface>

SEM images of cross sections of the polytetrafluoroethylene microporous films of Examples 1 to 3 and Comparative Examples 1 to 3 were taken. In each SEM image, 20 average pore sizes (P0-P20) were measured along its thickness, with P0 corresponding to the average pore size at the uppermost of the front surface (thickness=0), P1 corresponding to the average pore size at thickness 1, P2 corresponding to the average pore size at thickness 2, and so forth. The SEM images were taken at magnification of 1,000× to 5000× with a scanning electron microscope (Hitachi, model S-4000; deposition=Hitachi E-1030 sputter, both manufactured by Hitachi Ltd.). The SEM images were then scanned with an image processor (Hardware: TV Image Processor TVIP-4100 II, manufactured by Nippon Avionics Co., Ltd.; control software: TV Image Processor Image Command 4198, manufactured by Ratoc System Engineering Co., Ltd.) to obtain images of crystalline polymer fibers. By processing these images, average pore sizes were found.

Based on the values of P0-P20, the average pore sizes (μm) were plotted against the distance (μm) from the front surface in the thickness direction. The results are shown in FIGS. 9 to 14.

Figure 9:
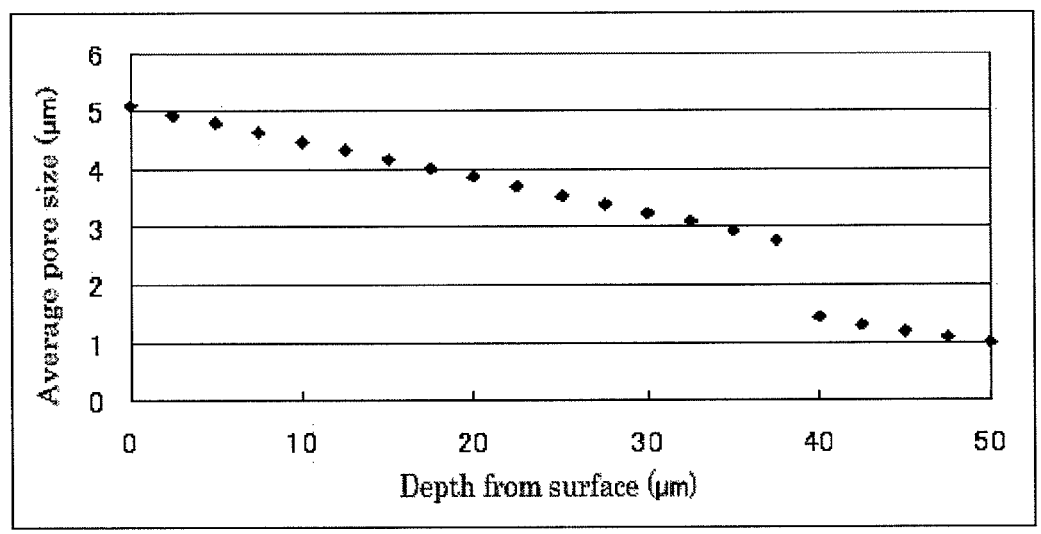
FIG. 9 is a graph of average pore size vs. depth from the surface in Example 1.

FIG. 9 demonstrates that the average pore size of each of the two crystalline polymer layers of the porous film of Example 1 changes (continuously decreases) along its thickness.

Figure 10:
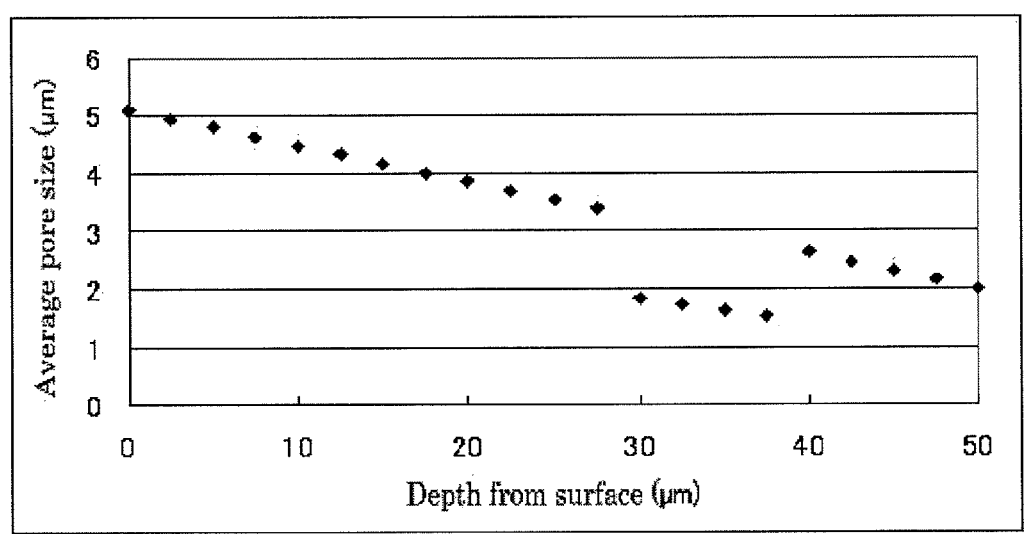
FIG. 10 is a graph of average pore size vs. depth from the surface in Example 2.

FIG. 10 demonstrates that the average pore size of each of the three crystalline polymer layers of the microporous film of Example 2 changes (continuously decreases) along its thickness, and that the crystalline polymer layer whose maximum average pore size is smaller than any other crystalline polymer layer is placed inside the microporous film.

Figure 11:
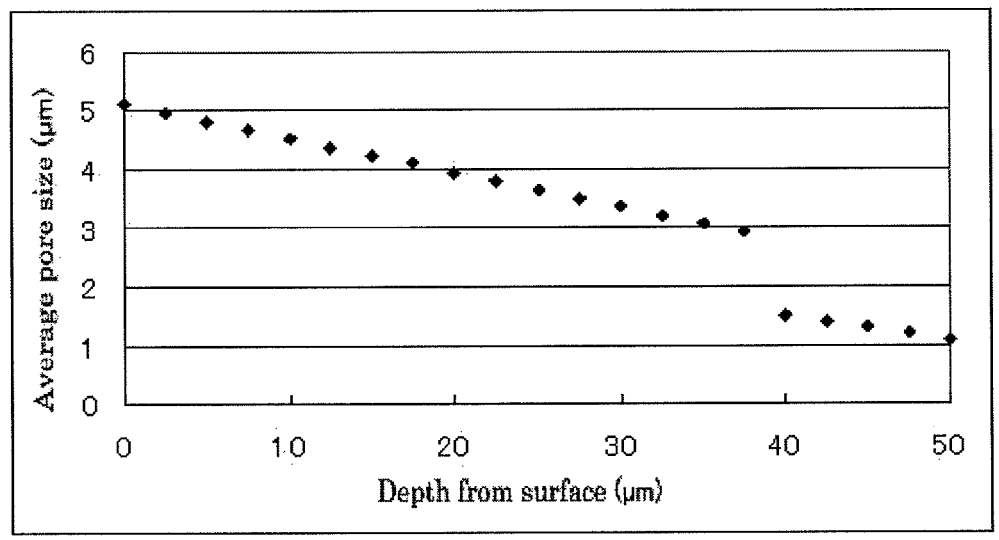
FIG. 11 is a graph of average pore size vs. depth from the surface in Example 3.

FIG. 11 demonstrates that the average pore size of each of the two crystalline polymer layers of the porous film of Example 3 changes (continuously decreases) along its thickness.

It was demonstrated that in the microporous films of Examples 1 to 3, the average pore size in the front surface is greater than the average pore size in the back surface (asymmetric heating surface), and that the crystalline polymer layers have different opening diameters.

Figure 12:
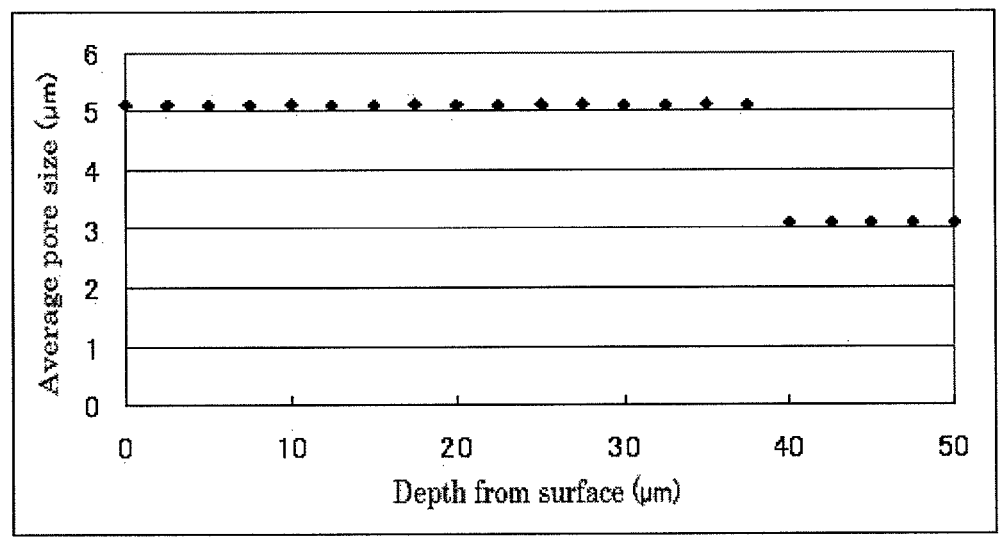
FIG. 12 is a graph of average pore size vs. depth from the surface in Comparative Example 1.
Figure 13:
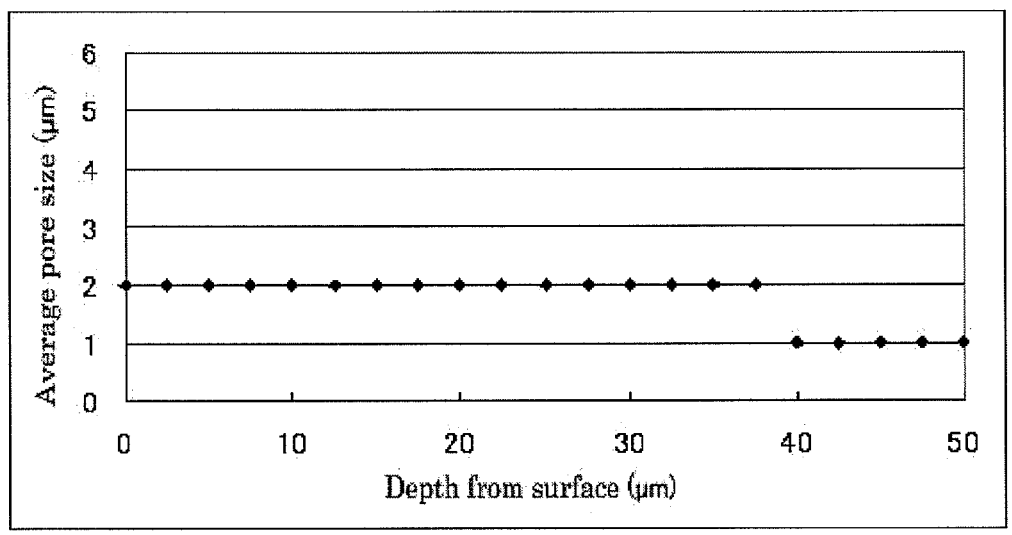
FIG. 13 is a graph of average pore size vs. depth from the surface in Comparative Example 2.
Figure 14:
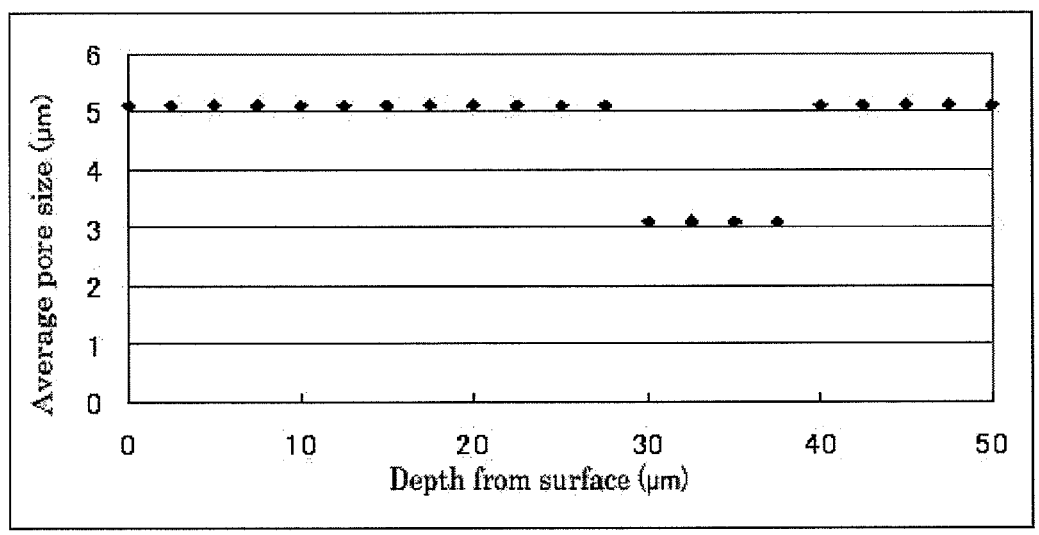
FIG. 14 is a graph of average pore size vs. depth from the surface in Comparative Example 3.

On the other hand, FIGS. 12 to 14 demonstrate that the average pore size of each of the crystalline polymer layers of the microporous films of Comparative Examples 1 to 3 does not change (gradient is zero in the graph) along the thickness, but changes in stages from the front surface toward the back surface.

<Filtration Test>

Filtration tests were carried out for the crystalline polymer microporous films of Examples 1 to 3 and Comparative Examples 1 to 3 as follows: A 0.01 wt % polystyrene latex (average particle size=0.17 μm) aqueous solution was filtrated at a differential pressure of 0.1 kg. The results are shown in Table 2.

TABLE 2

|  | Filtration test |
| --- | --- |
| Ex. 1 | 1,500 ml/cm$^2$ |
| Ex. 2 | 1,600 ml/cm$^2$ |
| Ex. 3 | 1,400 ml/cm$^2$ |
| Comp. Ex. 1 | Measurement failed |
| Comp. Ex. 2 | Less than 500 ml/cm$^2$ |
| Comp. Ex. 3 | Measurement failed |

Clogging occurred in the microporous film of Comparative Example 2 at 500 ml/cm$^2$. Moreover, measurements failed for the microporous films of Comparative Examples 1 and 3 since their pore size was too large to ensure sufficient capturing of microparticles. In contrast to these microporous films, the microporous films of Examples 1 to 3 were capable of filtration until 1,500 ml/cm$^2$, 1,600 ml/cm$^2$, and 1,400 ml/cm$^2$, respectively. Accordingly, it was demonstrated that filtration life can be significantly extended by use of the crystalline polymer microporous film of the present invention.

The crystalline polymer microporous film of the present invention and the filtration filter of the present invention including the same are capable of efficient capturing of microparticles for a long period of time and have excellent heat resistance and chemical resistance; therefore, they can be used under various circumstances where filtration is needed, and are suitably used for microfiltration of gases, liquids, etc., for example for filtration of corrosive gases and various gases for use in semiconductor industry, for filtration and sterilization of water for pharmaceutical preparations, production processes for pharmaceutical preparations, foods, etc., as well as washing water for electronics, and for high-temperature filtration and filtration of reactive reagents.

What is claimed is:

1. A crystalline polymer microporous film comprising:
   a laminate consisting of two or more crystalline polymer layers formed of crystalline polymers; and
   multiple pores penetrating though the laminate in the thickness direction thereof,
   wherein the average pore size of each of the crystalline polymer layers continuously changes along the thickness thereof,
   wherein the average pore size at a boundary between adjacent crystalline polymer layers changes in stages, and
   wherein the average pore size changes in the thickness direction in a manner of continuously increasing or continuously decreasing.

2. The crystalline polymer microporous film according to claim 1, wherein the crystalline polymer layers have different opening diameters.

3. The crystalline polymer microporous film according to claim 1, wherein the laminate consists of three or more of the crystalline polymer layers.

4. The crystalline polymer microporous film according to claim 1, wherein the crystalline polymers are each made of polytetrafluoroethylene.

5. The crystalline polymer microporous film according to claim 1, wherein the average pore size in one surface is 5 times to 30 times the average pore size in the other surface, in each of the crystalline polymer layers.

6. A manufacturing method of a crystalline polymer microporous film comprising:
   laminating two or more crystalline polymer layers to form a laminate, the crystalline polymer layers formed of different crystalline polymers;
   heating one surface of the laminate at a temperature from the melting point of the laminate to the melting point plus 15° C. to establish a temperature gradient in the thickness direction thereof; and
   stretching the laminate in which the temperature gradient has been established.

7. The manufacturing method according to claim 6, wherein the crystalline polymers have different number-average molecular weights.

8. The manufacturing method according to claim 6, wherein the crystalline polymers are each made of polytetrafluoroethylene.

9. The manufacturing method according to claim 6, wherein the stretching is uniaxial stretching.

10. The manufacturing method according to claim 6, wherein the stretching is biaxial stretching.

11. A filtration film comprising:
    a crystalline polymer microporous film which comprises a laminate consisting of two or more crystalline polymer layers formed of crystalline polymers, and multiple pores penetrating through the laminate in the thickness direction thereof,
    wherein the average pore size of each of the crystalline polymer layers continuously changes along the thickness thereof,
    wherein the average pore size at a boundary between adjacent crystalline polymer layers changes in stages, and
    wherein the average pore size changes in the thickness direction in a manner of continuously increasing or continuously decreasing.

12. The filtration filter according to claim 11, wherein a surface of the crystalline polymer microporous film, which surface has a larger average pore size than the other surface, is used as a filtration surface.

13. The filtration film according to claim 11, wherein the average pore size in one surface is 5 times to 30 times the average pore size in the other surface, in each of the crystalline polymer layers.

* * * * *